United States Patent [19]
Kidd

[11] Patent Number: 5,833,474
[45] Date of Patent: Nov. 10, 1998

[54] ELECTRICAL CONNECTION SYSTEM WITH TERMINALS CONNECTING MULTIPLE FLEX CIRCUITS

[75] Inventor: Richard Louis Kidd, Stow, Ohio

[73] Assignee: General Motors Corporation, Detroit, Mich.

[21] Appl. No.: 747,498

[22] Filed: Nov. 12, 1996

Related U.S. Application Data

[63] Continuation-in-part of Ser. No. 543,544, Oct. 16, 1995, Pat. No. 5,667,389.

[51] Int. Cl.$^6$ ........................................... H01R 9/07
[52] U.S. Cl. .............................. 439/77; 439/499
[58] Field of Search ................ 439/77, 75, 492, 439/499, 862

[56] References Cited

U.S. PATENT DOCUMENTS

| | | | |
|---|---|---|---|
| 3,292,133 | 12/1966 | Burch et al. | 339/126 |
| 3,893,745 | 7/1975 | Cordrino | 439/495 |
| 4,474,420 | 10/1984 | Nestor | 339/116 |
| 4,491,382 | 1/1985 | Ishikawa | 439/862 |
| 4,684,765 | 8/1987 | Beck et al. | 174/68.5 |
| 5,023,752 | 6/1991 | Detter et al. | 361/399 |
| 5,207,587 | 5/1993 | Hamill et al. | 439/76 |
| 5,354,211 | 10/1994 | Svette, Jr. et al. | 439/381 |
| 5,667,389 | 9/1997 | Kidd et al. | 439/75 |

*Primary Examiner*—Neil Abrams
*Attorney, Agent, or Firm*—Anthony Luke Simon

[57] ABSTRACT

An electrical connection system with terminals connecting multiple flex circuits for use as a power distribution system in automotive vehicles is disclosed. The system comprises a housing first and second templates (266, 244), wherein the first template includes a first cavity having a first internal housing wall and the second template includes a second cavity having a second internal housing wall (246), wherein the first and second templates are positioned so that the first and second cavities are aligned with each other, a terminal (200) extending through the first and second cavities and having a first fork-shaped portion (208) and a second fork shaped portion (203), wherein each of the first and second fork-shaped portions have open and closed ends and a free extending fork arm (206, 202), wherein the closed end of the first fork-shaped portion is affixed at the open end of the second fork-shaped portion; an external edge on each free-extending fork arm including a rounded protrusion (204), wherein the terminal comprises a singular planar piece; and first and second flex circuits (16, 14) substantially overlaying the templates, each with a part between one of the internal housing walls and one of the rounded protrusions.

3 Claims, 3 Drawing Sheets

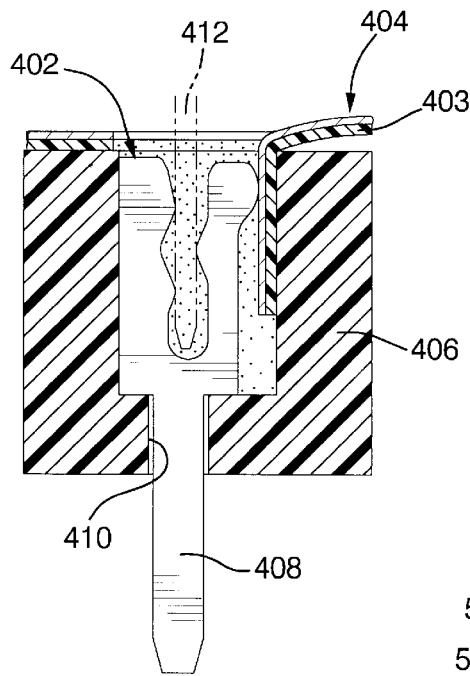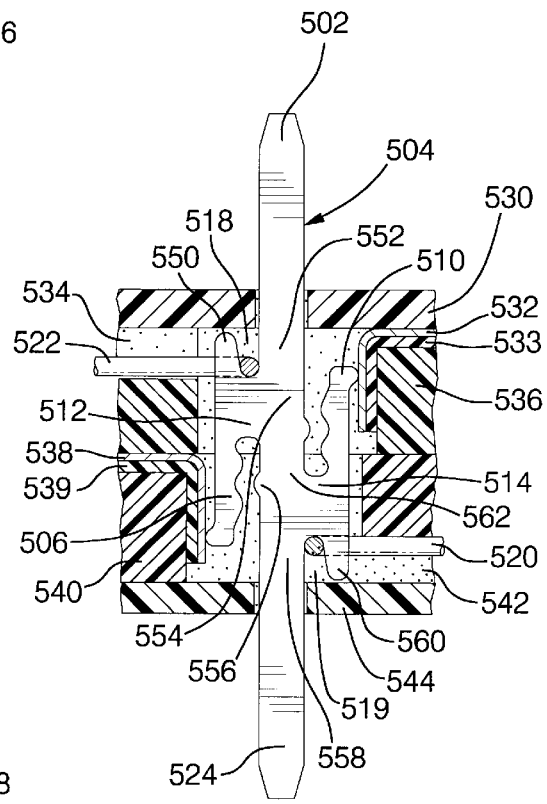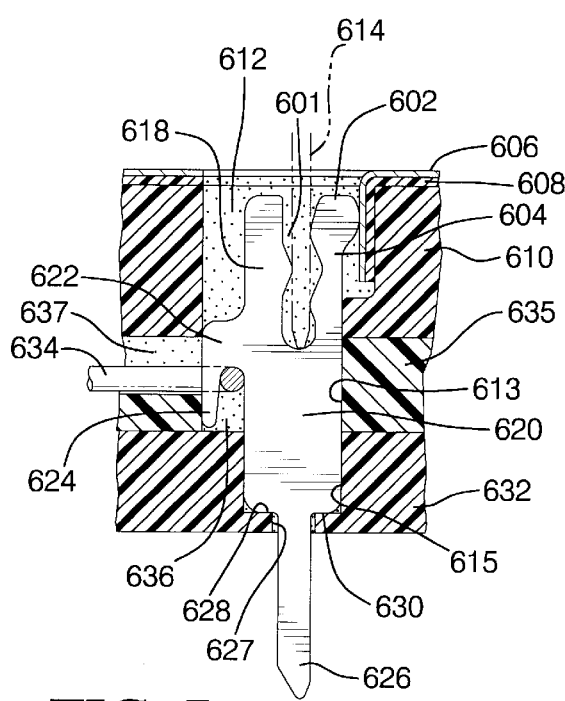

5,833,474

ELECTRICAL CONNECTION SYSTEM WITH TERMINALS CONNECTING MULTIPLE FLEX CIRCUITS

This invention is a continuation-in-part of U.S. patent application Ser. No. 08/543,544, filed Oct. 16, 1995, now U.S. Pat. No. 5,667,389.

This invention relates to an electrical connection system.

BACKGROUND OF THE INVENTION

Many electrical systems, such as those used in vehicles, require connection of various electrical wires together and to various electrical components such as fuses, relays, etc.. Such systems often include, in central locations, a series of electrical connections for busing and distributing electrical power among electric harnesses and electrical components in what are often referred to as distribution centers.

SUMMARY OF THE PRESENT INVENTION

Advantageously, this invention provides an electrical connection system suitable for use in electrical power distribution centers and electrical bus centers, such as often used in automotive vehicles.

Advantageously, this invention provides an electrical connection system suitable for use in electrically coupling different types of electrical conductors together and to electrical and electronic components such as fuses, relays, electronic circuits, etc.

Advantageously, according to a preferred example, this invention provides an electrical connection system comprising: a housing having a cavity and an internal housing wall within the cavity; a first terminal having a first body portion; an external edge of the first body portion including a first rounded protrusion on the external edge the first body portion, wherein the first terminal comprises a singular planar piece and wherein the first body portion and the first rounded protrusion are coplanar; and a flex circuit, at least part of which is located between the first rounded protrusion and the internal housing wall.

BRIEF DESCRIPTION OF THE DRAWINGS

The present invention will now be described by way of example with reference to the following drawings in which:

FIG. 5 illustrates a fourth example electrical connection system according to this invention;

FIG. 6 illustrates a fifth example electrical connection system according to this invention; and FIG. 7 illustrates a sixth example electrical connection system according to this invention.

DETAILED DESCRIPTION OF THE INVENTION

Figure 1:
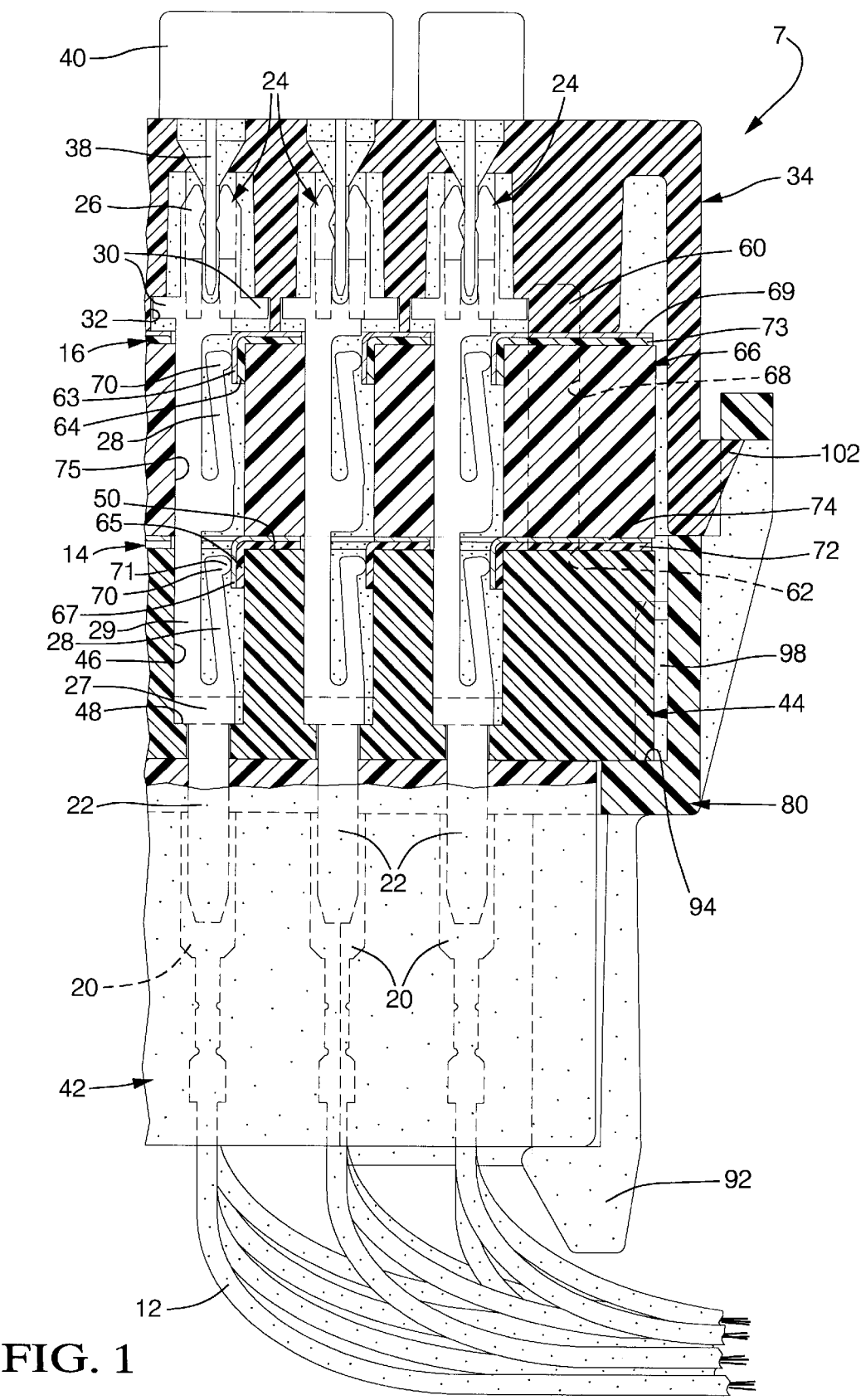
FIG. 1 illustrates an electrical power bus and distribution center including an example electrical connection system according to this invention.

Referring now to FIG. 1, the bus center shown has a group of bottom female terminals 20 that are electrically connected to the insulated wires 12 in a known manner. Each bottom female terminal 20 is mated with a male first end 22 of an intermediate terminal 24. The intermediate terminal 24 has a female second end 26 and two spring arms 28 positioned between the first and second ends 22 and 26. Proximate to the female second end 26, terminal 24 includes two lateral projections 30 positioned within a counterbore 32 of top template 34. The female head 26 of the intermediate terminal has a three-point contact of a known type with male blade 38 of an electrical component such as fuse 40. The electrical component may alternatively be a relay, circuit breaker, pluggable diode, AC resistor, electronic circuit or other electrical or electronic component. The intermediate terminal 24 is typically made from copper or other suitable electrically conductive material and is preferably formed by a single stamping operation. All of the features shown for each terminal 24 are coplanar and the terminal 24 forms a generally flat body.

Placed on top of body 42 holding female plug terminals 20 is a plastic or other suitable non-conductive material template 44. The template 44 has a series of holes 46 for receipt of the intermediate terminals 24 and each hole 46 has a shoulder region 48 for limiting the vertical position of the intermediate terminal 24. The template also includes one or more alignment pins 60, for example, placed at one or more corners of the template.

Placed on the top surface 50 of the template 44 is a flex circuit layer 14. The flex circuit layer 14 has holes 62 engaging the pins 60 to align the flex circuit layer 14 with respect to the template 44. Also, the flex circuit layer 14 is strategically placed as determined by the circuit design for the bus center. Flex circuit layer 14 includes flex circuit 74 and elastomer pad 72, each with a series of flags or flaps 67, 65 cut on three sides and allowed to bend into the holes 46 when intermediate terminal 24 is inserted past the flex circuit layer 14. Note, the elastomer pad 72 is optional in this example for reasons discussed further below.

Flex circuit layer 14 is sandwiched between template 44 and template 66. Template 66 is similar to template 44 with the exception that it does not have the shoulder regions 48. Template 66 includes a series of openings 75 that allow passage of the intermediate terminals 24.

A second flex circuit layer 16, comprising flex circuit 69 and elastomer pad 73 (elastomer pad 73 is also optional), is placed on top of the template 66 and also has the series of flags or flaps 63, 64. The flags 63 of flex circuit 69 protrude into the openings 75 of the template 66 wherein they make electrical contact with the head 70 of the arms 28 of the intermediate terminal 24. On the end of the head 70 is a rounded protrusion 71 extending, away from the second arm 29 of the terminal 24. By varying the pattern of the circuitry of the flex circuits 69 and 74 in a manner well within the level of those skilled in the art, intermediate terminals 24 are used to bus between the flexible circuits 69 and 74 and the flexible circuits are used for busing between various intermediate terminals 24 to satisfy the various vehicle electrical requirements for busing, switching, fusing or other current or voltage distribution modifications, etc.. The flex circuit itself may extend out of the distribution center to connect to another connector or various electrical components of the vehicle.

The flex circuits 69 and 74 are well known to those skilled in the art as generally comprising one or more clad copper layers between non-conductive (i.e., plastic) film layers. To avoid cluttering of the diagram, the non-conductive layers are not shown.

The system shown in FIG. 1 is described in more detail in pending U.S. Pat. No. 5,667,389, assigned to the assignee of this invention. Example operation of the connection system according to this invention is well illustrated with respect to FIG. 1. Each intermediate terminal 24 has two fork-shaped portions comprising the first and second fork arms 28 and 29 and the closed end 27. The rounded protrusion 71 from the end 70 of fork arm 28 presses against the flap 63 of the flex circuit 69, pressing the flap 63 of the flex circuit 69 between the protrusion 71 and the inner wall of the opening 46. Spring pressure is provided between flap 63 of the flex circuit 69 and protrusion 71 either by cantilever force of the fork arm 28, by the elastomer flap 64 (if an elastomer pad is included), or both.

In an alternative example, the fork arms 28 are omitted and the protrusion 71 for making contact to the flex circuit 69 is formed on the body of the terminal 24 located within the opening 75. In this example, since there is no fork arm to provide cantilever action and spring force, the elastomer pad 73 provides the spring force. Eliminating the fork arm 28 offers an overall reduction in size of the terminal 24.

Figure 2:
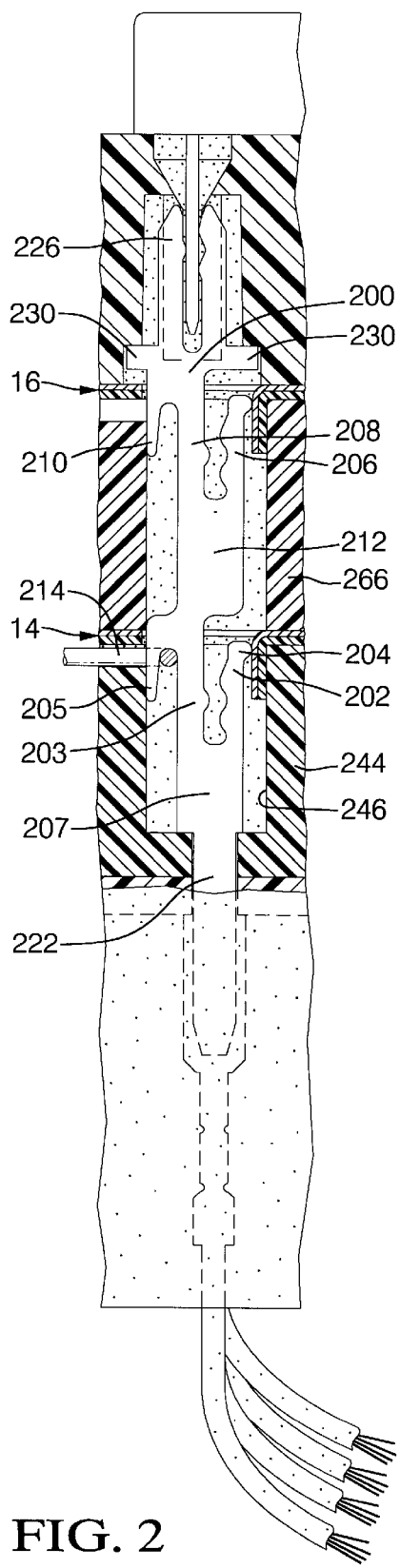
FIG. 2 illustrates a modification of the center shown in FIG. 1 including a second example electrical connection system according to this invention.

FIG. 2 illustrates a modification of the bus center shown in FIG. 1 with intermediate terminal 24 removed and replaced by intermediate terminal 200. Intermediate terminal 200 is similar to intermediate terminal 24 with respect to several features, such as the female end 226, the lateral extensions 230 and the male blade end 222. The fork-shaped portions, however, are altered and replaced by features 207, 212 and templates 44 and 66 are replaced by templates 244 and 266, as shown. The fork-shaped portion 207 includes first fork arm 202 opposite body portion 203. The first fork arm 202 has an end 204 with a rounded protrusion pressing against the flap of the flex circuit layer 14, trapping the flap between the end 204 and the inner wall of the opening 246. Fork arm 205 extends from the opposite side of body portion 203 to form a wire slot for making electrical connection to wire 214.

The wire 214 may be used for busing between various intermediate terminals or may be connected to a harness assembly, whichever is desired. Slots are provided in the template 244 in a known manner for routing the wire 214 through the template 244. Thus, as shown in FIG. 2, the example connection system provides, at the fork-shaped portion 207, electrical connection between the intermediate terminal 200, the flex circuit layer 14 and the wire 214. Electrical connection is also provided to the flex circuit layer 16 through the fork arm 206 located facing body portion 208. In the example shown, no wire is in the slot formed by fork arm 210 and body portion 208.

Figure 3:
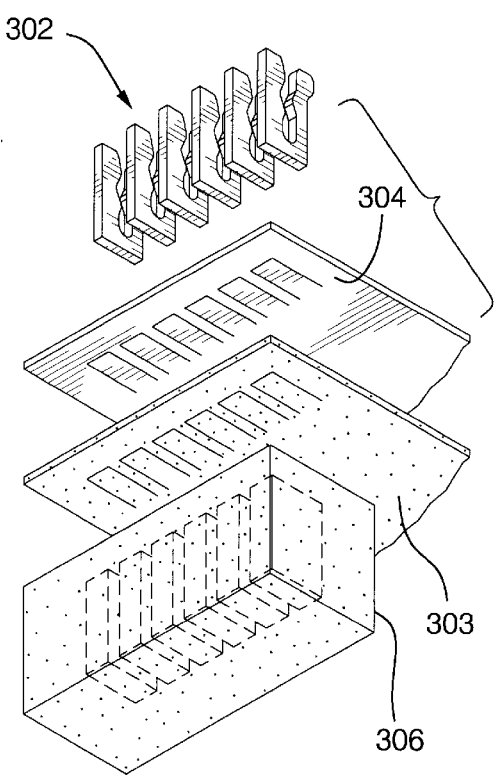
FIGS. 3 and 4 illustrate a third example electrical connection system according to this invention.

Referring now to FIG. 3, the example connection system shown comprises a plurality of terminals 302, a housing 306, a flexible circuit 304 and an elastomer pad 303 (optional). The connection system shown is suitable for implementing connections between flexible circuits and circuit components or connectors that have male terminals.

Figure 4:
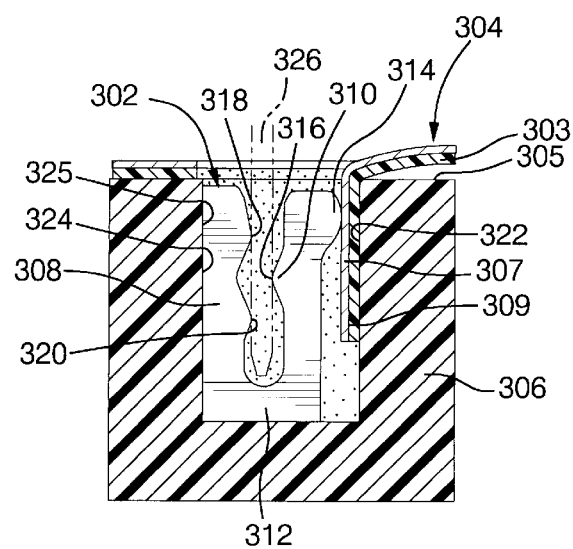

Referring now also to FIG. 4, the example connection system of FIG. 3 is shown assembled in cut-away view. The housing 306 has a series of holes 324 within which the terminals 302 are press fit.

Before the terminals 302 are inserted into the holes 324, the flexible circuit 304 and elastomer pad 303 are placed on the top surface 305 of the housing 306, with the elastomer pad 303 and flexible circuit 304 bonded by adhesive. The terminals 302 are then inserted in the holes forcing the flaps 307, 309 of the flexible circuit 304 and elastomer pad 303 into the holes 324. The terminals 302 are maintained within the housing by the press fit between the terminals 302 and the housing internal walls 325, 322, with the elastomer pad adding normal force to the press fit.

Each terminal 302 has first and second fork arms 308 and 310, with the fork arm 310 having a rounded protrusion 314 extending away from the fork arm 308. The rounded protrusion 314 presses a portion of flap 307, sandwiching it between the protrusion 314 and the inner wall 322 of the hole 324, thus establishing electrical contact between the copper of the flexible circuit and the terminal 302.

In the example shown, the terminal 302 has a series of three bumps 318, 316 and 320 implemented in a known manner for receiving a male terminal blade 326. The male terminal blade 326 may be part of a connector or may be a terminal of an electric or electronic circuit component.

Referring now to FIG. 5, the example electrical connection system shown is similar to the connection system shown in FIGS. 3 and 4 modified with a series of openings 410 provided in housing 406. The openings 410 allow a male blade portion 408 of the terminal 402 to protrude from the housing 406 to provide for electrical connection to a female connector or receptacle of an electronic or electric circuit component or harness connector. Thus, the system shown in FIG. 5 establishes electrical connection between the terminal 402, terminal blade 412 and the flex circuit 404 (overlaying elastomer pad 403) and provides a male terminal blade 408 extending from the housing 406.

Referring now to FIG. 6, another example electrical connection system according to this invention is shown implementing terminal 504 having four fork-shaped portions formed out of the body 562 of the terminal 504 and fork arms 506, 510, 550 and 560. The fork arm 510 and portion 554 of body 562 form one fork-shaped portion with closed end 514 and the fork arm 506 and portion 556 of body 562 form a second fork-shaped portion with closed end 512 disposed proximate to an end of body 562 opposite closed end 514. The terminal 504 provides contact to multiple layers of flexible circuits 532, 538 in the structure shown. A first template 540 has one or more holes for receiving one or more terminals 504. The template 540 has a series of slots 542 for receiving wire 520 in a known manner for providing busing between various terminals or connection to an electrical wiring harness or other electrical terminal. The wire 520 makes electrical contact with the terminal 504 by the wire slot 519 formed by fork arm 560 and body portion 558. Between template 540 and template 536, flex circuit 538 and elastomer pad 539 are provided with one or more flaps that fold in to engage with the protrusion at the end of arm 506 of the terminal 504, thus establishing electrical contact between the flex circuit 538 and the terminal 504.

The template 536 also has a series of slots 534 for receiving bus wire 522 that is routed through the template in a known manner and makes electrical contact with terminal 504 through the wire slot 518 formed by the fork arm 550 and body portion 552.

The round protrusion at the end of arm 510 makes electrical contact with the flap of flex circuit 532. The flex circuit 532 and elastomer pad 533 (optional) are sandwiched in place between housing end 530 and template 536 and the male blade 502 of the terminal 504 extends therefrom for receiving a female or forked terminal or electronic circuit connection.

Similarly, housing end 544 is located on the opposite end of template 540 and has an opening for male blade 524 of terminal 504 to extend therethrough to provide a similar source of electrical contact for a female or forked terminal or electronic circuit connection. Thus, in the system shown, the terminal 504 provides busing between various layers of flexible circuits, such as flexible circuits 532 and 538, serves as a source of connection to two wires, which may be bus wires or wires leading to a connector or harness, and two male blades 502 and 524.

The terminals 504 can be provided in rows and/or columns with respective holes provided in the housing ends 530 and 544 and templates 536 and 540, accordingly.

Referring now to FIG. 7, the example electrical connection system shown includes terminal 602 with first and second fork arms 604 and 618 extending from body 620 and fork arm 624 extending opposite body 620 from closed end 622. The fork arms 604 and 618 form slot 601 for receiving male terminal blade 614 and the fork arm 624 and body 620 form wire slot 636.

The terminal 602 is located in templates 610, 635 and 632 in the aligned openings 612, 613 and 615. Flex circuit 606 and elastomer pad 608 are located on the outer surface of template 610, and include flaps extending into the opening 612 and press fit between the rounded protrusion at the end of fork arm 604 and the inner wall of opening 612 in template 610. This establishes electrical contact between the flex circuit 606 and terminal 602.

The template 632 has opening 615 aligned with opening 612 in template 610 and receives the portion of terminal 602 proximate to male blade 626. The shoulder 630 of terminal 602 sits against the seat 628 located adjacent the opening 627 of template 632. Male blade 626 extends through opening 627 and out of the template 632.

Wire 634 makes electrical contact with the terminal 602 vis-à-vis the wire slot 636 and is routed through the template 635 vis-à-vis one or more slots 637 in a manner known to those skilled in the art.

In an alternative example, the wire slot 636 is provided with features of a known type that allow the wire 634 to be routed with the insulation on. Such features remove the insulation in a known manner as the slot 636 engages the wire 634, allowing metal to metal contact between the terminal 620 and the wire 634.

As in the above examples, the templates 610, 635 and 632 can be provided with a series of openings for receiving rows and/or columns of terminals 602.

I claim:

1. An electrical connection system comprising:

a housing including first and second templates, wherein the first template includes a first cavity having a first internal housing wall and the second template includes a second cavity having a second internal housing wall, wherein the first and second templates are positioned so that the first and second cavities are aligned with each other,;

a terminal extending through the first and second cavities and having a first fork-shaped portion and a second fork-shaped portion, wherein each of the first and second fork-shaped portions have open and closed ends and a free extending fork arm, wherein the closed end of the first fork-shaped portion is affixed at the open end of the second fork-shaped portion;

an external edge on each free-extending fork arm including a rounded protrusion, wherein the terminal is formed as a singular planar piece;

a first flex circuit substantially overlaying the first template, at least part of which is located between the first internal housing wall and the rounded protrusion of the free extending fork arm of the first fork-shaped portion; and a second flex circuit substantially overlaying the second template, between the first and second templates, at least a part of which is located between the second internal housing wall and the rounded protrusion of the free extending fork arm of the second fork-shaped portion.

2. An electrical connection system according to claim 1, wherein the first fork-shaped portion receives and makes electrical connection to a male blade of one member of a set comprising: a second terminal and an electrical device.

3. An electrical connection system according to claim 1, wherein the first fork-shaped portion receives and mates electrical connection to one member of a set comprising: a wire and a male blade.

* * * * *